Sept. 1, 1970 L. C. SCALA ET AL 3,526,544

INSULATED CONDUCTOR

Filed Dec. 13, 1967

WITNESSES

Theodore F. Wrobel

Lee P. Johns

INVENTORS
Edward J. Traynor and
Luciano C. Scala

BY

Frederick Shapoe

ATTORNEY

United States Patent Office 3,526,544

Patented Sept. 1, 1970

3,526,544

INSULATED CONDUCTOR

Luciano C. Scala, Murrysville, Pa., and Edward J. Traynor, Stoughton, Mass., assignors to Westinghouse Electric Corporation, Pittsburgh, Pa., a corporation of Pennsylvania Filed Dec. 13, 1967, Ser. No. 690,279

Int. Cl. B44d *1/16;* B32b *15/08*

U.S. Cl. 117—218 5 Claims

ABSTRACT OF THE DISCLOSURE

An insulated conductor comprising a substrate composed of copper foil, a film on the foil composed of an amino-silane forming an intermediate layer having a thickness of from about 10 to 50 angstroms, and an outer coating of a resin resistant to high temperatures.

BACKGROUND OF THE INVENTION

Field of the invention

This invention relates to resin insulated copper conductor, and particularly to flat copper foil conductors having a protective resinous insulating coating resistant to oxidation at elevated temperatures, having an intermediate extremely thin oxidation resistant amino-silane layer applied to the copper conductor and providing a high peel strength to an outer layer of high temperature resin insulation.

Description of the prior art

There is a need for an insulated electrical conductor such as copper foil, having a resinous insulation coating that is resistant to elevated temperatures and prevents the conductor from oxidizing so that the applied resinous insulation adheres well at all times. Various organic materials have been tried as insulation for electrical conductors usable at high temperatures. Synthetic resinous materials such as tetrafluoroethylene, trifluoromonochloroethylene, polyimides (such as set forth in U.S. Pat. No. 3,179,634), and polyamides-imides (such as set forth in U.S. Pat. No. 3,179,635) have not proved completely satisfactory on copper foil, for example, when used at temperatures of 175° C. and higher in air because the copper surface will oxidize and the resin will not adhere to oxidized copper surfaces. Although most synthetic resins such as polyimides and polyamide-imides are highly satisfactory insulation material for wire or flat sheet substrates of metal because of their high temperature characteristics, such materials are sufficiently permeable to oxygen which oxidizes the surface of the metal substrate such as copper and produces a copper oxide surface thereon. Synthetic resinous materials do not adhere to heavy buildups of copper oxide and coatings of resins loosen from the metal surface, thereby resulting in failure. Thus copper foil with 2 mils polyamide-imide resin films when heated for 96 hours at 230° C. had oxidized sufficiently that there was no bond of the resin to the copper.

In accordance with this invention it has been found that oxidation of the surface of the metal substrate of the conductor may be greatly reduced or prevented by the preliminary application to the copper of a protective film of an amino-silane having a thickness of from about 10 to about 50 angstroms over which a coating of a resinous polymer such as polyamide-imide is then applied.

SUMMARY OF THE INVENTION

Briefly, the present invention may be stated generally as including a copper conductor such as a foil substrate having a critically thin film of amino-silane applied as an initial coating to the surface for preventing or greatly reducing oxidation at elevated temperatures, and a coating of a high temperature resistant resin such as polyamide-imide resin for providing electrical insulation suitable for use at elevated temperature operations.

Accordingly, it is the general object of this invention to provide a resin insulated conductor, the metal substrate of which is coated with an intermediate thin oxygen resistant film to prevent oxidation of the metal surface.

It is another object of this invention to provide an insulated conductor having a high temperature resistant resinous coating which is tightly adherent to an intermediate thin oxygen resistant film on the surface of the metal substrate.

Finally, it is an object of this invention to satisfy the foregoing problems and desiderata in a simple and effective manner.

BRIEF DESCRIPTION OF THE DRAWINGS

For a better understanding of the nature and objects of this invention, reference is made to the drawings, in which.

DESCRIPTION OF THE PREFERRED EMBODIMENT

Figure 1:
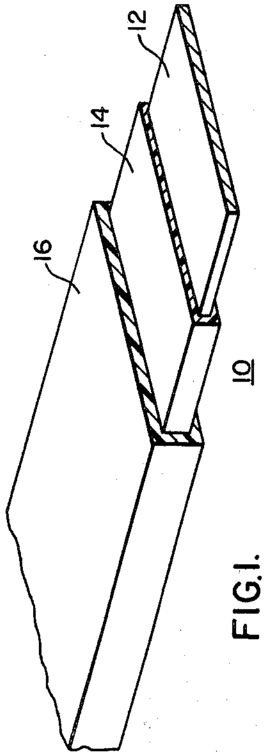
FIG. 1 is a fragmentary perspective view of a conductor in accordance with this invention.

As an illustration of the present invention, reference is made to FIG. 1 in the drawing, wherein an insulated conductor 10 includes an electrical foil 12, a thin inner layer or film 14 deposited on the foil, and an outer layer or coating 16 of resinous insulation. The foil 12 is composed of a metal such, for example, as copper foil of a conventional size such as 0.0027 inch thickness, and of any width desired up to 36 inches or more.

The intermediate thin film 14 is a material which has a very low permeability to oxygen and therefore does not prevent oxidation of the copper surface at elevated temperatures of 175° C. and higher. The film is composed of a material such as a silane or soluble siloxane polymer comprising at least one aliphatic group having an amino group substituted thereon, for example such aliphatic groups, as ethyl, propyl, butyl, and pentyl with an $NH_2$ group substituted thereon, or an amino group having an alkyl group replacing one hydrogen atom thereof.

More specifically the silane film consists of an amino substituted organosilicon compound having the general structure:

(a)

$$NH_2(R_1)_n-\overset{\displaystyle R_2}{\underset{\displaystyle R_4}{\overset{|}{\underset{|}{Si}}}}-R_3$$

and (b)

$$NH_2(R_1)_n-\left[\overset{\displaystyle R_2}{\underset{\displaystyle R_4}{\overset{|}{\underset{|}{Si}}}}-O\right]_m-\overset{\displaystyle R_2}{\underset{\displaystyle R_4}{\overset{|}{\underset{|}{Si}}}}-R_3$$

In the (a) structure above, the amino group would be attached directly to the silicon atom when $n=0$. $R_1$ represents an alkylene radical. $R_2$, $R_3$, and $R_4$ can represent a monovalent alkyl, alkoxy, aryl, or aryloxy radical. $n$ can be 0 or 1 and $m$ is from 0 to 25.

These nitrogen-containing compounds can exist in monomeric form as in (a) above. They can also be used in the polymeric form (b) by substituting a readily hydrolyzable group such as an OH group for any one of $R_2$, $R_3$, or $R_4$ followed by condensation through the OH groups to produce the (b) polymer.

As an example, one of the nitrogen-containing compounds which has been found to impart these benefits effectively is gamma-amino propyltriethoxy silane, having the following formula:

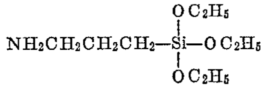

Other examples of the compounds for use in practicing the invention are:

(1)

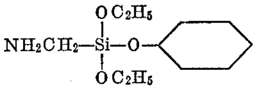

(2)

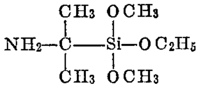

(3)

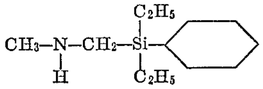

and (4)

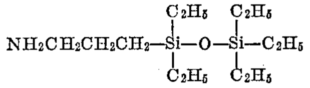

In Example 3 the amino group is a secondary amine.

The specific structure of the alkyl group can be varied and the $NH_2$ can be substituted on any one of the carbon atoms of the $R_1$ group to give an alpha, beta, gamma, delta, etc., amino substituted compound. Moreover, an amino group can be substituted on more than one alkyl group, if present, and the amino group can be a primary or secondary type, as in (3) above, or combination thereof.

While some improvement is obtained when the film 14 is applied either by dipping, spraying, or any other similar suitable method, the benefits are only moderate. Outstanding results are obtained when the method of applying the film 14 is to put on a mono or multimolecular layer of oriented molecules characterized by a uniform thickness by the use of the Langmuir monomolecular layer method. This film structure and method of deposition of an extremely thin film of uniform thickness is disclosed in U.S. Pat. No. 2,220,860. There the film is composed of amino-silane and when applied by this procedure the molecules are oriented perpendicular to the substrate surface, whereby one end of the molecule is attracted to the copper substrate and the other end of the molecule is repelled by the copper but is compatible with or adherent to the resin layer. The thickness of the film so applied ranges from about 10 to about 50 angstroms, the preferred thickness being about 25 angstroms. Heavy coatings of the amino-silanes applied by dipping or spraying have proven to be less desirable because of the low bond strength to the subsequent overcoating of resin.

The outer coating 16 is applied over the film 14 and is preferably composed of a resinous organic composition which is strong, thermoset and resistant to heat and chemical attack and therefore serves as good electrical insulation to the copper foil 12.

A preferred material for the outer coating 16 is a cured polyimide or polyamide-imide resin which has a thickness ranging from about 1 mil to 3 mils and more, a preferred thickness being about 2 mils. The coating 16 is applied preferably directly over the film 14. After the outer coating 16 is applied it is heat cured and the insulated conductor is ready for use.

Prototype conductor samples were subjected to peel strength tests to determine the degree of adherence of the coating 16 to the substrate 12 as well as the degree of oxidation of the surface of the copper substrate when heated to high temperatures in air.

The following example is illustrative of the present invention:

EXAMPLE I

Small size samples (0.0028" x 1" x 3") of rolled copper foil were treated in a hydrogen reducing furnace to remove all traces of oxide. The temperature of the furnace was 600° C. The samples were cooled in an inert atmosphere and bagged in polyethylene.

Subsequently upon removing the samples from the polyethylene bags a mono-molecular layer of gamma amino propyl silane was immediately applied to the surface. The Langmuir technique was used for the monolayer application. A thin coating of a solution of polyamide-imide in dimethylacetamide solvent corresponding to Example XVII of U.S. Pat. No. 3,179,635 about 0.1 of a mil thick was applied over the amino-silane monolayer surface and quickly cured by flash heating at 250° C. for a few minutes. A 2 mil film of polyamide-imide was then applied by dip coating in two passes, each dip coat being cured at 150° C. for 10 minutes. Following the second dip, a final cure was effected for 10 minutes at each temperature of 200°, 225°, 250°, and 275° C.

Figure 2:
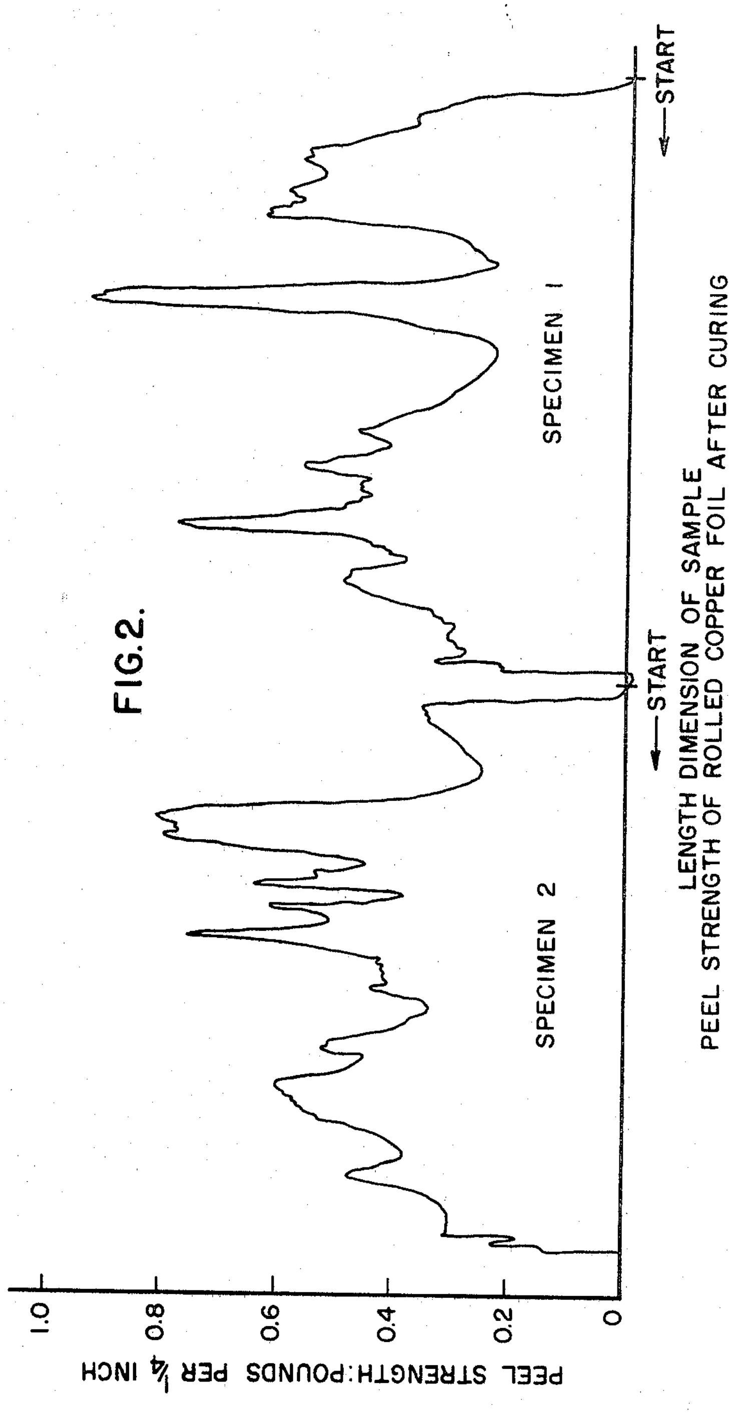
FIG. 2 is a graph of peel strength versus length dimension of sample of rolled copper foil having a surface film of amino-silane and a resin overcoat thereon.

Peel strength tests were conducted on these samples and FIG. 2 shows a continuous curve of the strength in pounds for ¼ inch wide samples and how it varied along the length of the individual sample.

From this curve it is found that the average peel strength per inch width for two specimens of the coated foil of the Example I is 2 pounds, and about 0.9 pound for the lowest value, excluding, of course the start and finish portions.

EXAMPLE II

An amino-silane coating was applied to rolled copper foil samples by a single dip through the 4.5% solution of the aminosilane of Example I in toluene and then air dried.

An initial overcoating of polyamide-imide polymer of Example I in dimethylacetamide solvent was applied in a very thin layer and immediately flash heated 250° C. for 10 minutes. The cured flash coating was from 0.1 to 0.2 mil in thickness. This flash heating was desirable in order to remove the dimethylacetamide solvent as quickly as possible, for a prolonged exposure to the solvent reduces the bond strength. The remainder of the polyamide-imide was applied in two passes each cured for 10 minutes at 150° C., to a toal of 2 mils.

In order to determine the amino-silane sensitivity to various resin cure temperatures, one-half of each sample was cured at 200°, 225°, 250°, and 275° for 10 minutes at each temperature. The other half of each sample was given an additional cure for 10 minutes at 300° C.

The samples were then aged in hourly increments up to 1000 hours at 230° C. Each sample was examined for oxidation, creasability, and adhesion. The results of peel strength tests are shown in the following table.

TABLE.—PEEL STRENGTH OF ROLLED COPPER FOIL COATED WITH A DIPPED FILM OF AMINO-SILANE AND AN OUTER LAYER OF POLYAMIDE-IMIDE RESIN

| Specimen identification | Hours aged at 230° C. | Avg. peel strength, pounds/inch width |
|---|---|---|
| AI-8 12+ | As received | 0.98 |
| AI-8 14 | As received | 0.66 |
| AI-8 24 | 24 | 0.19 |
| AI-8 23 | 56 | 0.06 |
| AI-8 21 | 96 | 0.04 |
| AI-8 20 | 120 | 0.04 |
| AI-8 19+ | 240 | 0.15 |
| AI-8 18+ | 295 | 0.14 |
| AI-8 17+ | 416 | 0.14 |
| AI-8 16+ | 518 | 0.10 |
| AI-8 15+ | 1050 | 0.08 |
| AI-8 24* | 24 | 0.25 |
| AI-8 23* | 56 | 0.23 |
| AI-8 21* | 96 | 0.08 |
| AI-8 20* | 120 | 0.11 |
| AI-8 19*+ | 240 | 0.19 |
| AI-8 18*+ | 295 | 0.17 |
| AI-8 17*+ | 416 | 0.12 |
| AI-8 16*+ | 518 | 0.20 |
| AI-8 15*+ | 1050 | 0.08 |

+Denotes that the ¼ inch strip specimens were cut, not etched.
*Denotes that the aromtic polyamide-imide resin was cured to a maximum temperature of 275° C. only. Other samples cured ten additional minutes at 300° C.

A comparison of Examples I and II, shows that after some 1000 hours at 230° C. in air, the average peel strength of the foil of Example I is 2 pounds per inch of width while for the Example II coated foil is 0.08 pound per inch of width. This clearly indicates the outstanding superiority of the process using a substantially monomolecular thick film of the amino-silane.

Conclusions from Examples I and II, after 1000 hours aging at 230° C. were:

(1) The outer resin did not embrittle.

(2) The samples could be creased at least once before the resin coating parted from the substrate at the crease point.

(3) In both cases no oxidation occurred at the copper amino-silane intersurface so that surface of the copper foil underneath the polyamide-imide coating remained bright.

Peel strengths of a minimum of about one pound per inch width, and averages of about 2 pounds per inch width were obtained with polyamide-imide film on rolled copper foil when the foil was treated with a substantially mono-molecular layer of amino-silane. With heavier coatings of the amino-silane, up to 20% of the original bond was retained on the copper foil after 500 hours aging at 230° C. And 8% was retained after 1000 hours, whereas without the amino-silane it was zero after 96 hours.

Prototype foil cable samples were fabricated with the amino-silane treatment on the copper foil surfaces. These cables comprised two ounce per square foot rolled copper foil continuously coated with amino-silane followed by a 2 mil build of polyamide-imide resin. After 500 hours aging at 230° C. the foil was bright and oxidation free and no delamination of the cable occurred. The interfacial bond remained intact even after exposure to the acids, etchants and solvents necessary in fabricating the open face cable conductor. Very thin coatings of silane must be applied to the copper foil and later to the open face cable to obtain the best bond. Flooding open face conductor with excessive silane solution causes premature bond failure between conductors and polyamide-imide resin backing.

The surface copper reaction product with the amino-silane is oxidatively stable and is apparently substantially impermeable to oxygen gas even at 230° C. for up to 1000 hours.

Since the dimethylacetamide solvent used in the polyamide-imide resin would attack the amino-silane coating when not removed promptly, the highest bond strength between the copper and polyamide-imide film was achieved when the amino-silane was applied in a single coating and air dried and an initial thin .0001" coat of polyamide-imide resin in the dimethylacetamide solvent was applied and quickly flash cured at 250° C. Subsequently heavier builds of polyamide-imide resin could then be safely applied and cured at either lower or higher temperatures and for longer times.

A slight reduction in peel strength was noticed after polyamide-imide resin coated rolled copper foil was exposed to a hot ferric chloride etchant solution. The polyamide-imide resin bond to rolled copper foil was improved when a monolayer of amino-silane was used in place of heavier coatings thereof. The monolayer was applied with a Langmuir trough and the maximum increase in adherence strength realized was at least four fold.

Polyimide resins such as disclosed in U.S. Pat. No. 3,179,634 and other resins resistant to high temperatures of 175° C. and higher can be substituted for the polyamide-imide resins of Examples I and II.

While copper foil has been specifically referred to in the examples, other shapes of copper conductors such as strap, wire, tinsel and braid may be substituted.

Accordingly, the present invention provides an insulated conductor having a copper foil-type substrate which is resistant to oxidation in elevated temperature atmospheres and therefore retains its insulation coating for longer periods of time than has been known in the prior art.

Various modifications may be made within the spirit of the invention.

What is claimed is:

1. An insulated conductor comprising a metal substrate, a thin intermediate film of at least one material selected from a group consisting of an aminosilane and a soluble organo silicon polymer comprising at least one aliphatic group in each molecule having an amino group substituted thereon, and an outer coating of a polyamide-imide resin bonded to the film.

2. The conductor of claim 1 in which the intermediate film has a thickness of from about 10 to 50 angstroms.

3. The conductor of claim 1 in which the intermediate film has a thickness of about 25 angstroms.

4. The conductor of claim 2 in which the outer coating has a thickness of from about 1 mil to 3 mils.

5. The conductor of claim 2 in which the coating has a thickness of about 2 mils.

References Cited

UNITED STATES PATENTS

| | | | |
|---|---|---|---|
| 2,220,860 | 11/1940 | Blodgett | 117—33.3 |
| 3,085,908 | 4/1963 | Morehouse et al. | |
| 3,088,847 | 5/1963 | Pines. | |
| 3,175,921 | 3/1965 | Hedlund. | |
| 3,397,046 | 8/1968 | Greyson | 117—218 X |

WILLIAM D. MARTIN, Primary Examiner

R. HUSACK, Assistant Examiner

U.S. Cl. X.R.

117—75, 132, 135.1, 47; 174—120